United States Patent
Song et al.

(10) Patent No.: US 9,760,065 B2
(45) Date of Patent: Sep. 12, 2017

(54) HOME APPLIANCE, HOME APPLIANCE SYSTEM, AND CONTROL METHOD THEREOF

(71) Applicant: LG ELECTRONICS INC., Seoul (KR)

(72) Inventors: Yujin Song, Changwon-si (KR); Kyoungdong Kim, Changwon-si (KR); Dongwoo Han, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 501 days.

(21) Appl. No.: 14/466,017

(22) Filed: Aug. 22, 2014

(65) Prior Publication Data

US 2015/0081103 A1    Mar. 19, 2015

(30) Foreign Application Priority Data

Aug. 22, 2013   (KR) .................. 10-2013-0099860

(51) Int. Cl.
*G01M 1/38*      (2006.01)
*G05B 11/01*    (2006.01)
(Continued)

(52) U.S. Cl.
CPC ............ *G05B 11/01* (2013.01); *F24F 11/006* (2013.01); *G05B 15/02* (2013.01); *H04W 4/008* (2013.01);
(Continued)

(58) Field of Classification Search
None
See application file for complete search history.

(56) References Cited

U.S. PATENT DOCUMENTS 8,461,725 B1 *  6/2013  Stubbs .................. H01H 9/54
                                                    307/140
9,621,368 B2 *  4/2017  Jin ...................... H04L 12/2807
                      (Continued)

FOREIGN PATENT DOCUMENTS

CN      102511129     6/2012
CN      102595005     7/2012
                    (Continued)

OTHER PUBLICATIONS

Chinese Office Action dated Jul. 21, 2016 issued in Application No. 201410419593.5 (with English translation).
(Continued)

*Primary Examiner* — Adam Lee
(74) *Attorney, Agent, or Firm* — KED & Associates, LLP

(57) ABSTRACT

A home appliance, a home appliance system, and a control method thereof are disclosed. Transmission and reception of data are performed between the terminal and the home appliance using near field communication (NFC), thereby easily checking information of the home appliance. In addition, operation of the home appliance is easily set and changed through an application installed in the terminal and information regarding the home appliance received from the home appliance is displayed through the terminal such that a user checks various kinds of information regarding the home appliance, thereby greatly improving user convenience.

12 Claims, 11 Drawing Sheets

(51) Int. Cl.
*F24F 11/00* (2006.01)
*G05B 15/02* (2006.01)
*H04W 4/00* (2009.01)

(52) U.S. Cl.
CPC ............... *F24F 2011/0064* (2013.01); *F24F 2011/0068* (2013.01); *F24F 2011/0091* (2013.01)

(56) References Cited

U.S. PATENT DOCUMENTS

| | | | | |
|---|---|---|---|---|
| 2002/0128728 A1* | 9/2002 | Murakami | ......... | G05B 23/0245 700/10 |
| 2004/0261626 A1* | 12/2004 | Mansbery | .......... | G05B 19/0426 99/331 |
| 2007/0080782 A1* | 4/2007 | Breitfuss | .............. | G06K 7/0008 340/10.1 |
| 2008/0282182 A1* | 11/2008 | Oosaka | ............... | H04L 12/2803 715/772 |
| 2009/0106160 A1* | 4/2009 | Skowronek | .......... | G06Q 20/045 705/75 |
| 2010/0161082 A1* | 6/2010 | Ebrom | ................... | G05B 15/02 700/17 |
| 2011/0158653 A1* | 6/2011 | Mazed | ................. | H04B 10/272 398/140 |
| 2011/0312278 A1* | 12/2011 | Matsushita | ....... | H04L 12/40013 455/66.1 |
| 2012/0185306 A1* | 7/2012 | Cheng | .................. | G06Q 20/209 705/14.4 |
| 2012/0268286 A1* | 10/2012 | Jin | ...................... | H04L 12/2807 340/815.4 |
| 2012/0271725 A1* | 10/2012 | Cheng | .................. | H04W 4/008 705/21 |
| 2012/0302166 A1* | 11/2012 | Yamaoka | ................ | H04W 8/22 455/41.1 |
| 2013/0052946 A1* | 2/2013 | Chatterjee | ............. | H04W 4/008 455/41.1 |
| 2013/0077537 A1* | 3/2013 | Zhakov | ................... | H04W 4/16 370/260 |
| 2013/0171931 A1* | 7/2013 | Leutgeb | .............. | H04W 76/023 455/41.1 |
| 2013/0173076 A1* | 7/2013 | Pan | .......................... | H02J 3/14 700/292 |
| 2013/0173474 A1* | 7/2013 | Ranganathan | ..... | G06Q 20/0655 705/67 |
| 2013/0173811 A1* | 7/2013 | Ha | ........................ | H04W 76/02 709/227 |
| 2013/0198056 A1* | 8/2013 | Aldrey | ................. | G06Q 30/018 705/38 |
| 2013/0203346 A1* | 8/2013 | Han | ..................... | H04M 1/7253 455/41.1 |
| 2013/0247117 A1* | 9/2013 | Yamada | ................. | G08C 17/02 725/93 |
| 2013/0252544 A1* | 9/2013 | Leutgeb | ............... | H04B 5/0031 455/41.1 |
| 2013/0252545 A1* | 9/2013 | Leutgeb | ............... | H04B 5/0031 455/41.1 |
| 2013/0254844 A1* | 9/2013 | Leutgeb | ............... | H04W 12/00 726/3 |
| 2013/0264383 A1* | 10/2013 | Ko | .......................... | G06F 17/30 235/375 |
| 2013/0285837 A1* | 10/2013 | Uchida | ............... | H04L 12/2825 340/870.02 |
| 2014/0045458 A1* | 2/2014 | Beilis | .................. | H04L 63/0853 455/411 |
| 2014/0074346 A1* | 3/2014 | Chiaverini | ............. | G07C 5/008 701/31.5 |
| 2014/0131452 A1* | 5/2014 | Testanero | ........... | G06K 19/0723 235/492 |
| 2014/0155033 A1* | 6/2014 | Lazaridus | ........... | H04M 1/6091 455/411 |
| 2014/0170969 A1* | 6/2014 | Devos | ..................... | G06F 17/30 455/41.1 |
| 2014/0227975 A1* | 8/2014 | Kuroyama | ............. | G08C 17/02 455/41.1 |
| 2014/0236328 A1* | 8/2014 | Kamon | ................... | D06F 33/02 700/90 |
| 2014/0267559 A1* | 9/2014 | Krantz | ..................... | H04M 9/082 348/14.08 |
| 2015/0172385 A1* | 6/2015 | Kuroyama | ............ | H04W 4/008 709/219 |

FOREIGN PATENT DOCUMENTS

| | | |
|---|---|---|
| CN | 102768514 | 11/2012 |
| EP | 2477378 A1 | 7/2012 |
| KR | 10-2012-0065650 | 6/2012 |
| KR | 10-2012-0065659 | 6/2012 |
| KR | 10-2013-0030876 | 3/2013 |
| WO | WO 2008/137062 | 11/2008 |

OTHER PUBLICATIONS

European Search Report issued in Application No. 14181799.9 dated Feb. 5, 2015.

* cited by examiner

HOME APPLIANCE, HOME APPLIANCE SYSTEM, AND CONTROL METHOD THEREOF

CROSS-REFERENCE TO RELATED APPLICATION

This application claims the priority benefit of Korean Patent Application No. 10-2013-0099860, filed on Aug. 22, 2013 in the Korean Intellectual Property Office, the disclosure of which is incorporated herein by reference.

BACKGROUND

1. Field of the Invention

The present invention relates to a home appliance, a home appliance system, and a control method thereof and, more particularly, to the home appliance that changes and controls communication settings of the home appliance through transmission and reception of data to and from a terminal, a home appliance system including the home appliance, and a control method thereof.

2. Description of the Related Art

In general, home appliances include an air conditioner, a washing machine, a refrigerator, a television, an electric rice cooker, a dryer, and a dehumidifier.

The air conditioner is an apparatus that discharges cool air or hot air into a room to adjust room temperature and to purify air in the room, thereby providing a more comfortable room environment for people.

The air conditioner includes an indoor unit, which includes a heat exchange, and an outdoor unit, which includes a compressor and a heat exchanger. The air conditioner is operated by controlling power supplied to the compressor or the heat exchanger. In addition, the air conditioner may include one outdoor unit and at least one indoor unit connected to the outdoor unit.

The air conditioner performs a cooling operation or a heating operation according to the flow of a refrigerant. The cooling operation of the air conditioner is performed as follows. A high-temperature, high-pressure liquid refrigerant is supplied to the indoor unit from the compressor of the outdoor unit via the heat exchanger of the outdoor unit. The refrigerant is expanded by the heat exchanger of the outdoor unit with the result that the refrigerant is evaporated and, therefore, the temperature of surrounding air is lowered. As an indoor unit fan is rotated, cool air is discharged into the room. On the other hand, the heating operation of the air conditioner is performed as follows. A high-temperature, high-pressure gaseous refrigerant is supplied to the indoor unit from the compressor of the outdoor unit. The high-temperature, high-pressure gaseous refrigerant is liquefied by the heat exchanger of the indoor unit with the result that air is heated. As the indoor unit fan is rotated, the heated air is discharged into the room.

In a case in which a plurality of indoor units is connected to one outdoor unit, a plurality of outdoor units is connected to each other, a plurality of units, such as a ventilation unit and a heat pump, is connected to the outdoor unit, or a plurality of sites is connected to each other, the above-described units are integrally managed through an additional central control device.

In a conventional air conditioner, a user sets an operation mode, temperature, and air volume of the air conditioner using a remote controller to control operation of the air conditioner. As described above, the user can perform simple operation control but cannot check information regarding the operation or state of the air conditioner. In addition, even when the air conditioner operates abnormally, it is difficult to determine abnormality of the air conditioner.

Therefore, there is a high necessity for a method of providing information regarding failure of the air conditioner as well as basic information regarding the air conditioner for the user to easily check the state of the air conditioner and, in addition, of performing operation settings of the air conditioner per user.

The above references are incorporated by reference herein where appropriate for appropriate teachings of additional or alternative details, features and/or technical background.

SUMMARY OF THE INVENTION

It is an object of the present invention to provide a home appliance, information of which is checked, operation of which is controlled through settings per user, and settings of which are changed using a terminal contacting the home appliance to communicate with the home appliance such that the home appliance is easily operated, a home appliance system including the home appliance, and a control method thereof.

The above objects of the present invention are achieved by the features defined in claims.

In accordance with an aspect of the present invention, the above and other objects can be accomplished by the provision of a home appliance including a display unit to output operation information and an operation state of the home appliance, a tag unit to perform near field communication (NFC), and a controller to control operation of the home appliance based on an input setting, wherein the tag unit includes a tag storage unit to store data and a transmission and reception unit to recognize a terminal approaching the home appliance within a predetermined distance or contacting the home appliance through the near field communication and to transmit and receive data to and from the terminal, and the controller receives the data stored in the tag storage unit to change operation settings of the home appliance and to control operation of the home appliance and stores data corresponding to a request of the terminal received through the transmission and reception unit in the tag unit such that the data are transmitted to the terminal through the transmission and reception unit.

In accordance with another aspect of the present invention, there is provided a terminal for controlling a home appliance including a display unit to output operation information of the home appliance, a tag communication unit to transmit and receive data to and from the home appliance through near field communication, and a terminal controller to transmit setting data input through the tag communication unit to the home appliance, to analyze data received from the home appliance, and to output the analyzed data through the display unit, wherein the terminal controller executes an application to control the home appliance to configure a control menu according to an input model name or a type of the home appliance, outputs the configured control menu to a screen of the display unit, and transmits and receives data to and from the home appliance through the tag communication unit to control the home appliance.

In accordance with another aspect of the present invention, there is provided a home appliance system including a terminal having a near field communication function and a home appliance including a tag unit to perform the near field communication, the home appliance being configured to store data of the home appliance in the tag unit, to transmit the stored data of the home appliance to the terminal, and to control operation of the home appliance in response to data received through the tag unit, wherein the terminal executes an application to control the home appliance to transmit and receive data to and from the tag unit through the near field communication, and the terminal configures a control menu of the application based on a model or a type of the home appliance to control and monitor the home appliance.

In accordance with a further aspect of the present invention, there is provided a method of a terminal controlling a home appliance including executing an application to control the home appliance, differently configuring a control menu based on a model or a type of the home appliance and displaying the control menu on a screen of a display unit, requesting data from the home appliance through near field communication based on an item selected from the control menu, and analyzing data received in response to the request and displaying information regarding the home appliance.

The method may further include displaying a setting menu to control the home appliance based on the item selected from the control menu and communicating with the home appliance through the near field communication to transmit the setting menu to the home appliance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, reference will now be made in detail to embodiments, examples of which are illustrated in the accompanying drawings. Advantages and features of the present invention and a method of achieving the same will be more clearly understood from embodiments described below with reference to the accompanying drawings. However, the present invention is not limited to the following embodiments but may be implemented in various different forms. The embodiments are provided merely to complete disclosure of the present invention and to fully provide a person having ordinary skill in the art to which the present invention pertains with the category of the invention. The invention is defined only by the category of the claims. Wherever possible, the same reference numbers will be used throughout the specification to refer to the same or like elements.

In the following description of embodiments of the present invention, an air conditioner will be described as an example of a home appliance. However, the present invention is not limited thereto. For example, a washing machine, a television, a refrigerator, or an electric rice cooker may be applied or exclusively used as a home appliance within the scope of the invention.

Figure 1:
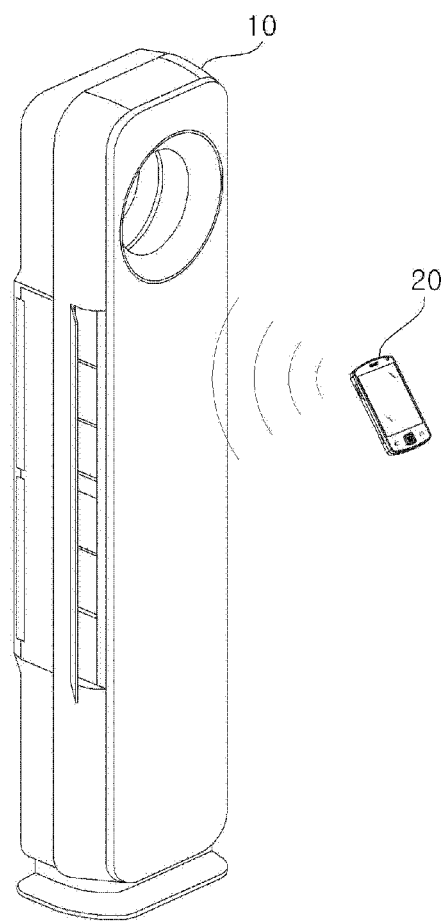
FIG. 1 is a view showing the construction of a home appliance system including a home appliance and a terminal according to an embodiment of the present invention.

FIG. 1 is a view showing the construction of a home appliance system including a home appliance and a terminal according to an embodiment of the present invention.

Referring to FIG. 1, a home appliance system according to an embodiment of the present invention includes a home appliance 10 and a terminal 20 to communicate with the home appliance 10 using near field communication (NFC).

The home appliance 10 includes a tag unit (not shown) to store product information, operation state, and failure information of the home appliance 10 and, in addition, to transmit and receive data to and from the terminal 20 through near field communication. When the terminal 20 comes into contact with the tag unit or when the terminal 20 approaches the tag unit within a predetermined distance, the tag unit transmits and receives data to and from the terminal 20. According to circumstances, the tag unit may be detachably attached to the home appliance 10.

In addition, the home appliance 10 includes a case forming the external appearance thereof, a discharge port to discharge air, and an air direction adjustment means to adjust the direction of the discharged air, thereby controlling air discharged into a room.

An indoor unit includes an expansion valve (not shown) to expand a refrigerant supplied from an outdoor unit (not shown) connected to the indoor unit, an indoor unit heat exchanger to perform heat exchange between the refrigerant and air, an indoor unit fan (not shown) to introduce indoor air into the indoor unit heat exchanger and to discharge the heat-exchanged air into the room, a plurality of sensors (not shown), and a controller (not shown) to control operation of the indoor unit. The indoor unit controls rotational speed of the indoor unit fan to control suctioned air and discharged air, thereby adjusting air volume or air flow. In addition, the indoor unit may further include a human sensing unit to sense a human body present in an indoor space according to circumstances. In addition, the indoor unit may further include an output unit to display an operation state and setting information of the indoor unit and an input unit to input setting data.

On the other hand, the outdoor unit is operated in a cooling mode or in a heating mode to supply a refrigerant to at least one indoor unit in response to a request of the indoor unit connected to the outdoor unit or an external control command. The outdoor unit includes at least one compressor (not shown) to compress a refrigerant introduced into the compressor and to discharge a high-pressure gas refrigerant, an accumulator (not shown) to separate the refrigerant into a gas refrigerant and a liquid refrigerant to prevent the liquid refrigerant, i.e. the refrigerant which has not been evaporated, from being introduced into the compressor, an oil separator to collect oil from the refrigerant discharged from the compressor, an outdoor unit heat exchanger (not shown) to condense or evaporate the refrigerant through heat exchange between the refrigerant and outdoor air, an outdoor unit fan (not shown) to introduce air into the outdoor unit heat exchanger and to discharge the heat-exchanged air out of the outdoor unit such that heat exchange performed by the outdoor unit heat exchanger is more smoothly achieved, a four-way valve (not shown) to change a flow channel of the refrigerant according to an operation mode of the outdoor unit, at least one pressure sensor (not shown) to measure pressure, at least one temperature sensor (not shown) to measure temperature, and a controller to control operation of the outdoor unit and to communicate with other units. The outdoor unit may further include a plurality of sensors, a valve, and an overcooling device, detailed descriptions of which will be omitted.

The terminal 20 includes a communication module to transmit and receive data to and from the tag unit of the home appliance 10 through near field communication (NFC). In addition, the terminal 20 may further include an input unit to transmit specific data to the home appliance and a display unit to display data of the home appliance.

The terminal 20 contacts the tag unit of the home appliance through the communication module to receive data of the home appliance and, in addition, writes data stored in the terminal 20 into the tag unit. At this time, the terminal 20 may transmit and receive data to and from the tag unit of the home appliance 10 through one contact between the terminal 20 and the tag unit of the home appliance 10. The contact includes approach of the terminal 20 to the tag unit of the home appliance 10 within a predetermined distance without physical contact between the terminal 20 and the tag unit of the home appliance 10 such that the terminal 20 recognizes the tag unit of the home appliance 10 and transmits and receives data to and from the tag unit of the home appliance 10 in addition to physical contact between the terminal 20 and the tag unit of the home appliance 10.

The terminal 20 includes an application to transmit and receive data to and from the home appliance 10 and to control the home appliance 10. The terminal 20 executes the application to display information of the home appliance 10 received through contact with the tag unit of the home appliance 10, to control the home appliance 10, and diagnose a failure of the home appliance 10.

According to circumstances, the home appliance system may further includes a server (not shown) to communicate with the home appliance 10 and the terminal 20.

During execution of the application, the terminal 20 accesses the server, matches information of the home appliance 10 with identification (ID) for server access, and registers the home appliance 10 with the server to monitor and control the home appliance 10 over a network. In addition, the server may store data regarding failure diagnosis of the home appliance 10.

In addition, the air conditioner may further include a ventilation unit, an air purification unit, a humidification unit, a dehumidification unit, and a heater in addition to the outdoor unit and the indoor unit.

Figure 2:
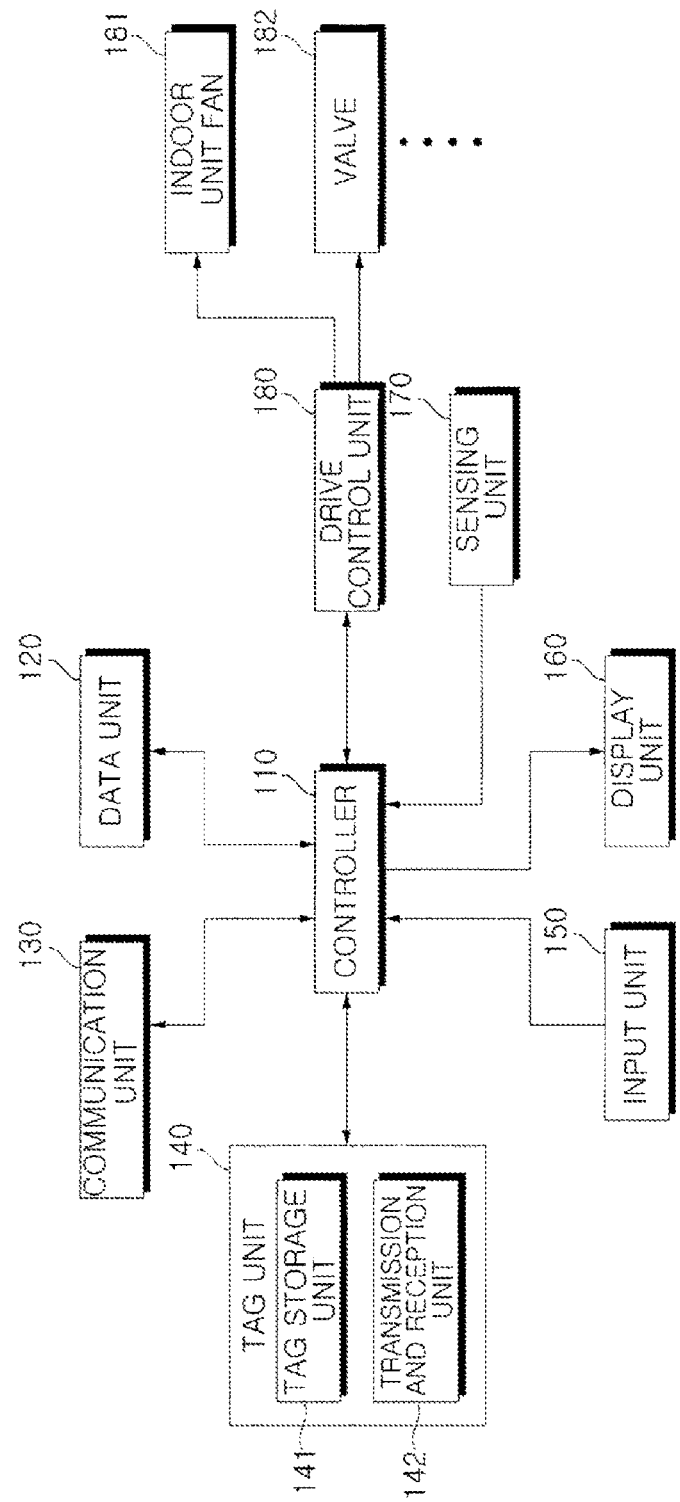
FIG. 2 is a block diagram showing the construction of a home appliance according to an embodiment of the present invention.

FIG. 2 is a block diagram showing the construction of a home appliance according to an embodiment of the present invention.

An indoor unit of an air conditioner includes a communication unit 130, a data unit 120, a drive control unit 180, a sensing unit 170, an input unit 150, a display unit 160, a tag unit 140, and a controller 110 to control overall operation of the indoor unit.

The communication unit 130 connects the indoor unit to an outdoor unit such that the indoor unit transmits and receives data to and from the outdoor unit. In addition, the communication unit 130 may be connected to an additional indoor unit or a remote controller to transmit and receive data to and from the additional indoor unit or the remote controller. Furthermore, the communication unit 130 may be connected to an external Internet. The communication unit 130 may perform communication in a wireless communication mode as well as in a wired communication mode. The communication unit 130 may include a plurality of communication modules based on the communication mode thereof.

The drive control unit 180 controls operation of the indoor unit according to a control command of the controller 110. The drive control unit 180 controls opening and closing of a valve 182 provided in the indoor unit and rotation of an indoor unit fan 181. The drive control unit 180 may include a fan control unit and a valve control unit.

The sensing unit 170 includes a plurality of sensors to measure data, such as temperature, pressure, rotational speed, voltage, and current. The sensing unit 170 measures information of the interior and the exterior of the indoor unit through the sensors and inputs the measured information to the controller 110. In addition, the sensing unit 170 may further include a sensing means to sense people present in a room based on the position at which the sensing unit 170 is installed.

The input unit 150 includes at least one predetermined input means. The input unit 150 inputs a predetermined signal to the controller 110 according to manipulation of the input means.

The input unit 150 may be constituted by a button, a dome switch, a touch pad (static pressure or electrostatic), a jog wheel, a jog switch, a finger mouse, a rotary switch, or a jog dial. The input unit 150 is not particularly restricted so long as the input unit 150 creates predetermined input data according to manipulation, such as push, rotation, pressure, or contact.

The display unit 160 displays various kinds of information regarding an operation state and operation settings of the air conditioner. The display unit 160 may display a connection state of the indoor unit when a terminal 20 contacts a tag unit of the indoor unit in response to a control command of the controller 110. In addition, in a case in which the air conditioner is connected to a network according to set access information, the display unit 160 may display an access state of the air conditioner based thereon.

The display unit 160 may be constituted by a display device, such as a liquid crystal display (LCD) or a light emitting diode (LED) display. According to circumstances, the display unit 160 may be constituted by a touch screen. However, the present invention is not limited thereto. In addition, in a case in which the display unit 160 is constituted by a touch screen, the touch screen may function as an input unit as well as a display unit.

The home appliance may include a speaker to output a predetermined sound and a lamp lit or blinking to output an operation state of the home appliance, a connection state between the home appliance and another home appliance, or warning in addition to the display unit 160.

The data unit 120 stores basic data regarding the indoor unit and the outdoor unit, control data necessary to control operation of the home appliance, input and output data, and data received through the communication unit 130.

The data unit 120 may include a nonvolatile memory, such as one or more magnetic disc storage devices, a flash memory device, or other nonvolatile solid memory devices. However, the present invention is not limited thereto. The data unit 120 may include a readable storage medium. For example, the data unit 120 may include an electronically erasable and programmable read only memory (EEP-ROM). However, the present invention is not limited thereto. Information may be written into the EEP-ROM or removed from the EEP-ROM under control of the controller 110. The EEP-ROM may be a storage device that retains information without removal of the information even when the home appliance is powered off and, therefore, power is not supplied to the EEP-ROM.

The tag unit 140 includes a tag storage unit 141 to store data and a transmission and reception unit 142 to perform transmission of data to the terminal or the controller.

The tag unit 140 may be operated according to simple contact (tag) with the terminal 20 in a near field communication (NFC) mode. In addition, the tag unit 140 may freely process data and may transmit and receive the processed data. The near field communication is compatible with various appliances. In a case in which data standard requirements are met among all terminals each including a near field communication module, it is possible to achieve data synchronization.

In general, the near field communication may perform communication within a communication distance of less than 10 cm. The near field communication has a short communication distance and, therefore, there may be a low risk that personal information is exposed. In a case in which a near field communication function is enabled, the tag unit 140 may read or write data from or into the tagged appliance.

When the terminal 20 contacts the tag unit 140, the tag unit 140 indicates that the tag unit 140 is in contact with the terminal 20. Even in a case in which new data are present, the tag unit 140 sets a plug based thereon and displays a state of data.

The tag storage unit 141 stores separately stores data received from the terminal 20 and data of the air conditioner written by the controller 110. For example, the tag storage unit 141 may store setting data necessary for the terminal 20 to change setting of the air conditioner and operation control data to control operation of the air conditioner. In addition, the tag storage unit 141 may store state data of the air conditioner and data necessary to diagnose the home appliance.

When the terminal 20 contacts the home appliance, the transmission and reception unit 142 transmits data stored in the tag storage unit 141 to the terminal 20 or stores data received from the terminal 20 in the tag storage unit 141. At this time, the transmission and reception unit 142 communicates with the terminal 20 in a near field communication (NFC) mode.

Even when the air conditioner is powered off and, therefore, is not operated, the tag unit 140 may be independently operated irrespective of whether the air conditioner is operated. Data transmitted and received in a state in which the air conditioner is not operated are transmitted to the controller 110 immediately when the air conditioner is operated.

The controller 110 processes data input and output through the input unit 150 and the display unit 160, controls the air conditioner and the terminal to communicate with each other through the communication unit 130, and controls the air conditioner to perform a predetermined operation according to settings. The controller 110 controls the indoor unit and the outdoor unit based on data measured or sensed by the sensing unit 150 and determine whether the indoor unit and the outdoor unit are normally operated.

The controller 110 senses a state of the tag unit 140. In a case in which new data are present in the tag unit 140, the controller 110 receives the data to change operating settings of the air conditioner or control operation of the air conditioner, transmits data requested through the tag unit 140, and transmits data collected during operation of the air conditioner to the tag unit 140 such that the data are stored in the tag unit 140.

In addition, the controller 110 controls the air conditioner according to input operation settings. According to circumstances, the controller 110 may control operation of the indoor unit and the outdoor unit based on data received from a remote controller connected to the air conditioner.

Figure 3:
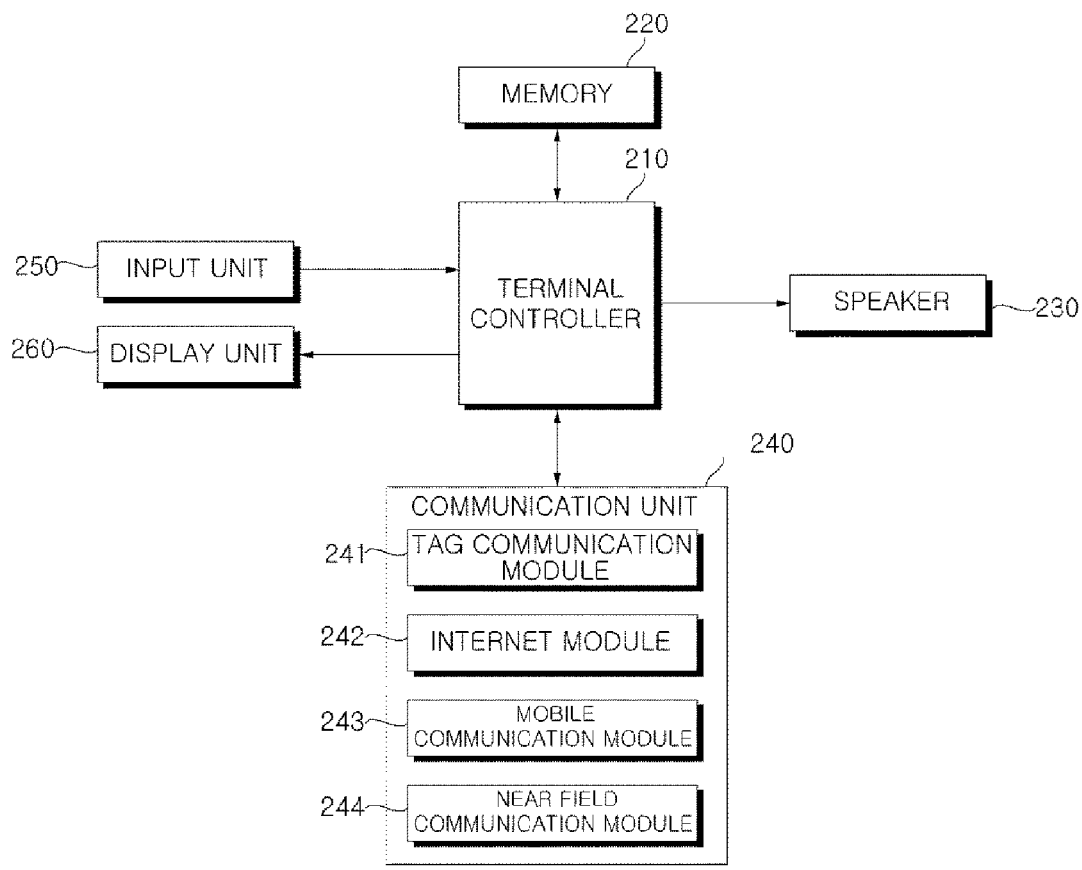
FIG. 3 is a block diagram showing the construction of a terminal according to an embodiment of the present invention.

FIG. 3 is a block diagram showing the construction of a terminal according to an embodiment of the present invention.

Referring to FIG. 3, a terminal 20 includes a communication unit 240, a speaker 230, a display unit 260, an input unit 250, a memory 220, and a terminal controller 210 to control overall operation of the terminal 20. In addition, the terminal 20 includes a sensor, such as a position information sensor or an acceleration sensor, based on the type of the terminal 20. The other elements of the terminal 20 will be omitted.

The input unit 250 includes at least one button or a touch input means. According to circumstances, the input unit 250 may include both a button and a touch input means. The input unit 250 applies a user command input according to manipulation of the input means to the terminal controller 210.

The display unit 260 is a predetermined display means that outputs numerals, letters, special characters, or images. The display unit 260 may be constituted by an LCD or an LED display. According to circumstances, the display unit 260 may be constituted by a touch screen having a layered touch pad.

The display unit 260 outputs a user command input through the input unit 250 to a screen or outputs a predetermined screen corresponding to the input user command to display information regarding operation settings, an operation state, and abnormality of the air conditioner based on data received from the air conditioner.

When a program to control the air conditioner is executed and data are transmitted and received through the communication unit 240, the display unit 260 displays a control menu of the air conditioner and operation information of the air conditioner and provides a predetermined input and output interface.

The speaker 230 outputs a predetermined effect sound or a predetermined warning sound. In a specific situation, for example, when operation of the terminal starts or ends, when the terminal is abnormally operated, or when the terminal receives a user input, the speaker 230 outputs a predetermined effect sound or a predetermined warning sound.

The memory 220 stores setting data input through the input unit 250, control data to control operation of the terminal, and data of the air conditioner received through the communication unit 240.

In addition, the memory 230 stores a program to control the air conditioner as an application (API). At this time, the program to control the air conditioner may be downloaded from a server. Alternatively, the program to control the air conditioner may be downloaded from another application server.

The communication unit 240 includes a plurality of communication modules to transmit and receive data in a wired or wireless communication mode. For example, the communication unit 240 may include a tag communication module 241, an Internet module 242, a mobile communication module 243, and a near field communication module 244.

The terminal 20 communicates with a server, a remote controller, or another air conditioner using the Internet module 242. In addition, the terminal 20 may access a mobile communication network through the mobile communication module 243 based on the type of the terminal 20 to use a voice service as well as transmission and reception of data. The near field communication module 244 transmits and receives data within a predetermined distance in a communication mode, such as Bluetooth, ZigBee, or infrared communication. The tag communication module 241 is a kind of near field communication (NFC) module. When the terminal 20 contacts the tag unit of the air conditioner, the tag communication module 241 transmits and receives data to and from the tag unit of the air conditioner.

The terminal controller 210 stores data transmitted and received through the communication unit 240 in the memory 220 and controls input and output of data. The terminal controller 210 controls operation of the terminal based on data input through the communication unit 240 and the input unit 250. Alternatively, the terminal controller 210 may control operation settings of the air conditioner to be changed through an application.

The terminal controller 210 displays a menu screen to input a user command on the display unit 260, transmits data to the server or the air conditioner through the communication unit 240 according to an input setting of the input unit 250, and receives data from the server or the air conditioner.

The terminal controller 210 executes an application stored in the memory 220, communicates with the home appliance based on contact with the home appliance through the tag communication module 241 of the communication unit 240, and requests specific data from the air conditioner or receives data from the air conditioner through the application.

In addition, during execution of the application, the terminal controller 210 differently displays a control menu displayed through the display unit 260 in response to data input through the input unit 250 and analyzes data received through the tag communication module 241 to diagnose a state of the home appliance and to output the result of diagnosis.

At this time, in diagnosing the state of the home appliance, the terminal controller 210 may request data for diagnosis through additional access to the server and transmit the result of diagnosis.

When the terminal communicates with the air conditioner through the tag communication module 241, the terminal controller 210 may perform a predetermined authentication process. In addition, authentication may be performed by inputting identification (ID) or a password according to a self setting of the application.

When the terminal contacts the air conditioner, the terminal controller 210 may display a different screen per ID on the display unit 26 according to a given authority.

Figure 4:
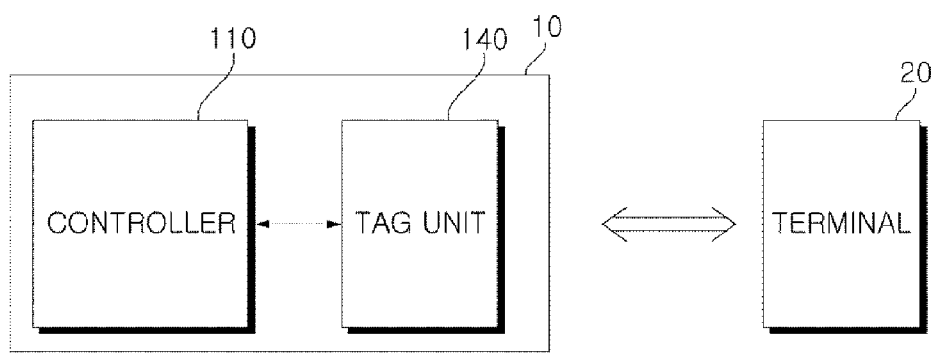
FIG. 4 is a view showing an example of communication through contact between a terminal and a home appliance according to an embodiment of the present invention.

FIG. 4 is a view showing an example of communication through contact between a terminal and a home appliance according to an embodiment of the present invention.

Referring to FIG. 4, the air conditioner 10, specifically the indoor unit of the air conditioner 10, is configured such that the controller 110 and the tag unit 140 transmit data to each other. According to circumstances, the tag unit 140 may be detachably attached to the air conditioner 10.

Even in a state in which operation of the air conditioner is stopped and, therefore, the controller 110 and the tag unit 140 cannot transmit data to each other, the tag unit 140 may receive a specific request or data from the terminal 20 and store the received specific request or data through contact with the terminal 20.

When the air conditioner is operated, the controller 110 may check a state of the tag unit 140 to determine whether new data are present in the tag unit 140. Upon determining that new data are present in the tag unit 140, the controller 110 may receive data stored in the tag unit 140. During communication with the terminal 20, the tag unit 140 may set a flag indicating that the tag unit 140 is in communication with the terminal 20 and determine whether the controller 110 can transmit and receive data to and from the tag unit 140 according to the set flag.

That is, the tag unit 140 is configured such that the tag unit is on standby for a predetermined time during communication between the tag unit 140 and the terminal 20 and receives data stored in the tag unit 140 after the communication between the terminal 20 and the tag unit 140 is completed.

When the terminal 20 contacts the tag unit 140, the terminal 20 executes an application to control the air conditioner to request data from the tag unit 140 or to receive data stored in the tag unit 140 according to a selected menu. At this time, the tag unit 140 and the terminal 20 transmit and receive data through one contact between the tag unit 140 and the terminal 20.

The terminal 20 may display the received data on an application screen. As needed, the terminal may analyze the data and display the result of analysis on the screen. For example, in a case in which a state of the air conditioner is diagnosed, the terminal 20 determines a failure of the air conditioner based on stored diagnosis data and displays the result of diagnosis on the screen. In a case in which additional data are needed, the terminal 20 may receive data from the server through the communication unit 240.

Figure 5:
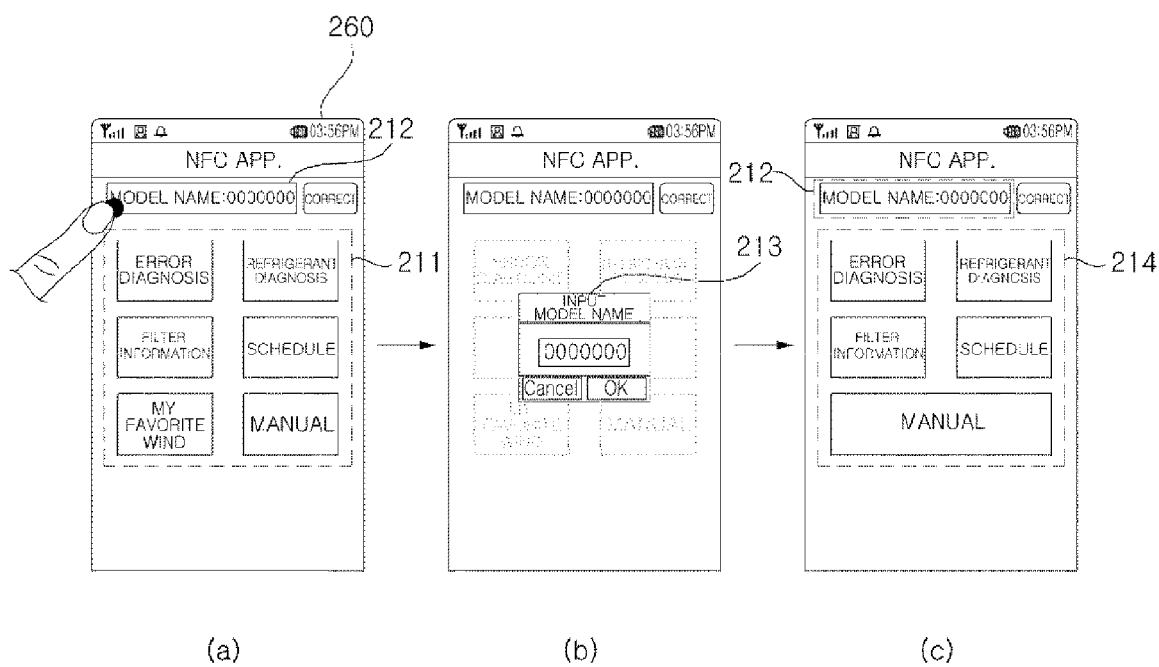
FIGS. 5 and 6 are reference views illustrating a method of setting a terminal based on the type of a home appliance according to an embodiment of the present invention.
Figure 6:
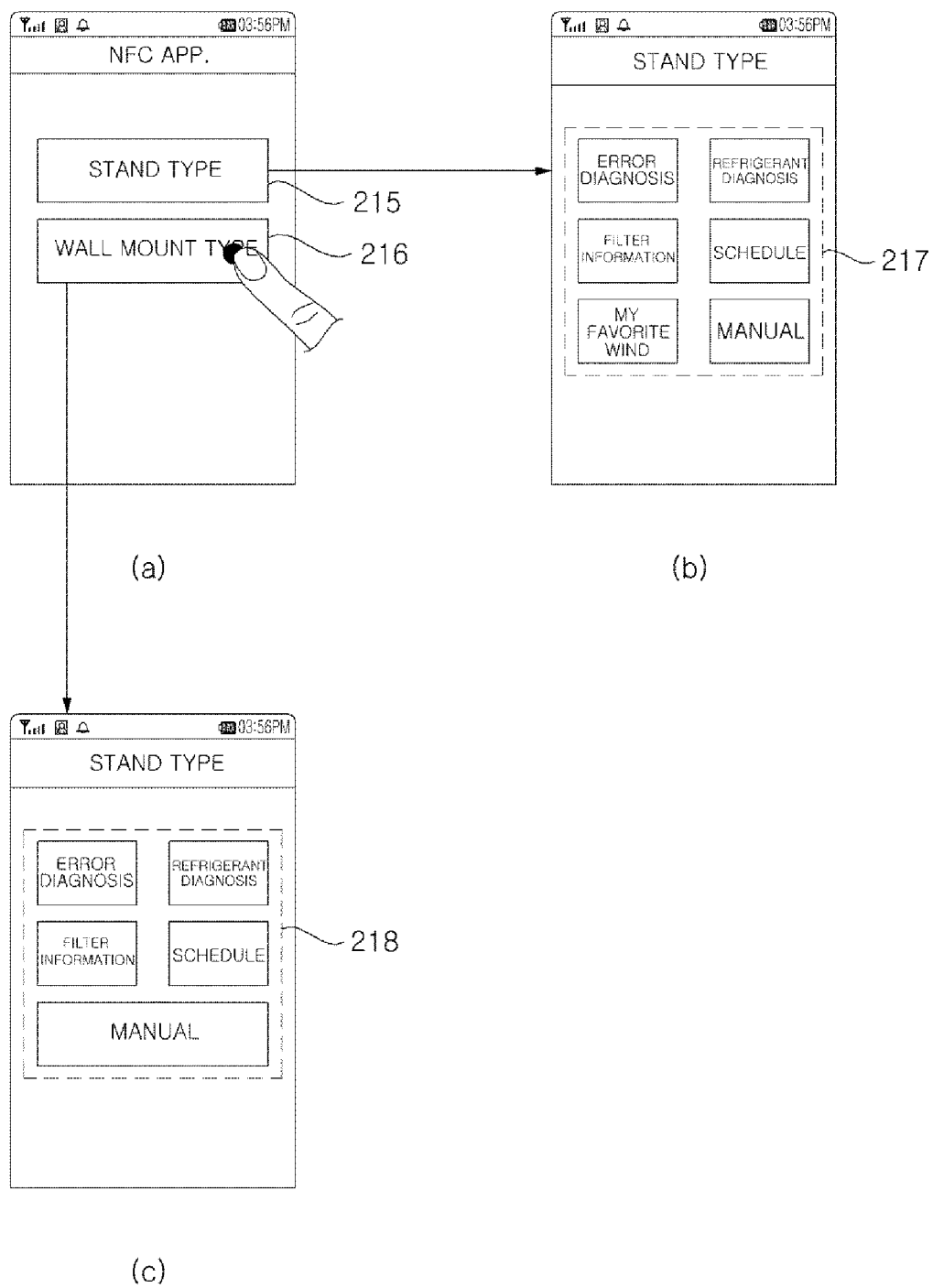

FIGS. 5 and 6 are reference views illustrating a method of setting a terminal based on the type of a home appliance according to an embodiment of the present invention. FIG. 5 is a view showing the construction of a control menu changed according to a model name and FIG. 6 is a view showing the construction of a control menu according to the type of an air conditioner.

As shown in FIG. 5(a), when the terminal 20 executes an application to control the air conditioner, at least one control menu 211 and an object to be controlled, i.e. a model information window 212, are displayed.

Error diagnosis, refrigerant diagnosis, filter information, schedule, my favorite wind, and manual items are displayed as the control menu 211.

Upon selection of the model information window 212, a popup window 213 to input a model name is displayed on a screen as shown in FIG. 5(b).

When the input of the model name is completed, the input model name is displayed on the screen and a changed control menu 214 based on the model name is displayed on the screen as shown in FIG. 5(c).

Error diagnosis, refrigerant diagnosis, filter information, schedule, and manual items may be displayed as the changed control menu 214.

Since functions that can be set may be changed based on a model type, the control menu is changed and displayed based on the input model name. The terminal controller 210 determines the model type of the air conditioner based on the input model name and classifies functions that can be supported per model type to change the construction of the control menu.

In a case in which it is not possible to check the model name as shown in FIG. 6(a), it is possible to select an indoor unit type. Upon selection of any one of indoor unit types displayed on the screen, a control menu is differently displayed based on the selected indoor unit type.

An indoor unit type selection menu is configured to select any one from between a stand type 215 and a wall mount type 216.

The air conditioner is configured based on various indoor unit types, such as a ceiling type, an indoor and outdoor unit combination type, a stand type, and a wall mount type. At home, the stand type and the wall mount type are generally used. For this reason, any one is selected from between the stand type and the wall mount type. In a case in which the air conditioner is configured based on indoor unit types other than the stand type and the wall mount type, the model name may be input to classify the type of the air conditioner as previously described with reference to FIG. 5.

In a case in which the stand type 215 is selected, a control menu 217 corresponding to the stand type is displayed on the screen as shown in FIG. 6(*b*).

On the other hand, in a case in which the wall mount type 216 is selected, a control menu 218 corresponding to the wall mount type is displayed on the screen as shown in FIG. 6(*c*).

For the stand type, error diagnosis, refrigerant diagnosis, filter information, schedule, my favorite wind, and manual functions are provided. For the wall mount type, on the other hand, error diagnosis, refrigerant diagnosis, filter information, schedule, and manual functions are provided.

Since settable or changeable functions are changed based on the type of the air conditioner and the indoor unit type as described above, the terminal 20 differently displays the control menu based on the input model name or indoor unit type.

FIGS. 7 to 12 are reference views illustrating a method of a terminal setting a home appliance according to an embodiment of the present invention.

Figure 7:
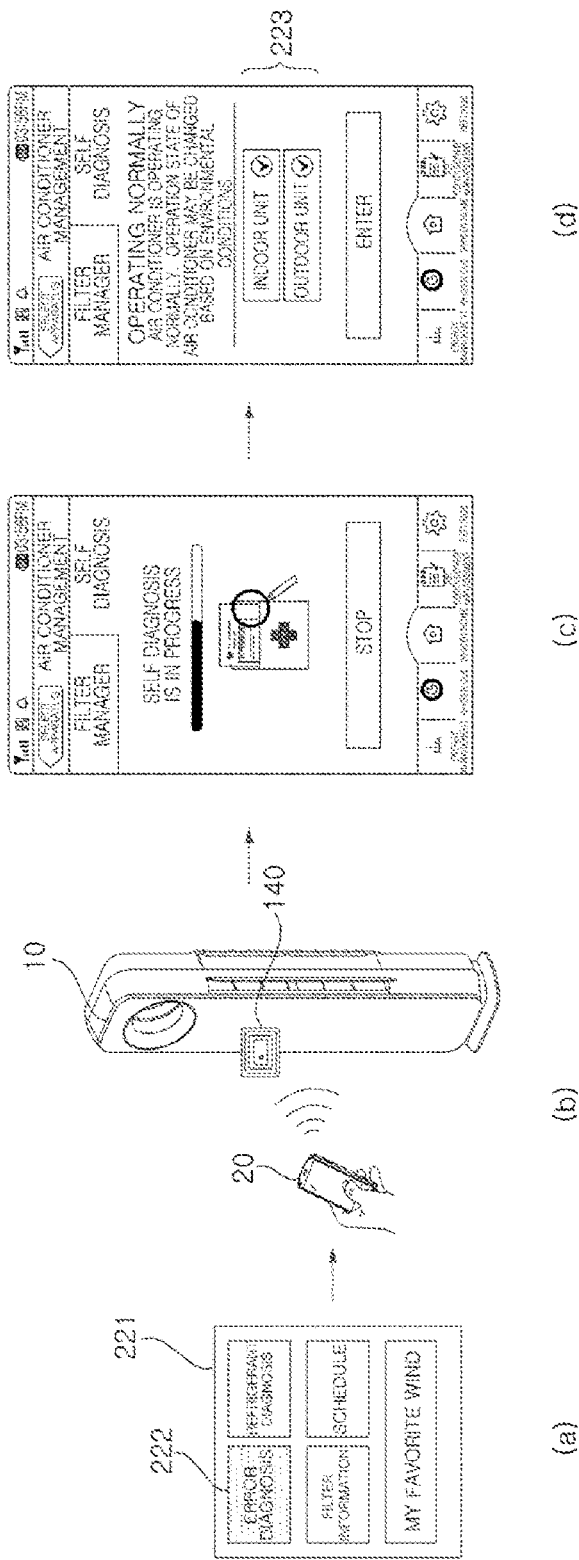
FIGS. 7 to 12 are reference views illustrating a method of a terminal setting a home appliance according to an embodiment of the present invention.

FIG. 7 is a reference view illustrating a method of a terminal diagnosing an error of an air conditioner. When an application of the terminal to control the air conditioner is executed and a model name or an indoor unit type is set, a control menu 221 including settable functions is displayed on the display unit 260 of the terminal as shown in FIG. 7(*a*). Error diagnosis, refrigerant diagnosis, filter information, schedule, and my favorite wind items are displayed as the control menu.

An error diagnosis item 222 is selected and then the terminal 20 is brought into contact with the tag unit 140 of the indoor unit of the air conditioner 10. At this time, communication between the terminal 20 and the tag unit 140 is performed when the terminal approaches tag unit 140 within a predetermined distance as well as contact between the terminal 20 and the tag unit 140. At this time, a tagging method of the terminal or a guide message indicating how the terminal tags the indoor unit may be displayed on the screen of the display unit. The guide message may be displayed as text or an image. At the same time, a voice may be output.

When the terminal 20 contacts the tag unit of the indoor unit, the tag communication module 241 of the terminal communicates with the tag unit 140 of the indoor unit such that the tag communication module 241 of the terminal and the tag unit 140 of the indoor unit transmit and receive data to and from each other.

Since the error diagnosis item 222 is selected, the terminal controller of the terminal 20 requests data necessary for error diagnosis through the tag communication module 241. The transmission and reception unit 142 of the tag unit 140 reads data of the air conditioner stored in the tag storage unit 141 and transmits the read data to the terminal according to the request of the terminal. At this time, in a case in which the requested data are not present in the tag storage unit 141, the transmission and reception unit 142 may request data from the controller 110 and transmit received data to the terminal 20.

Data necessary for error diagnosis include error codes generated during recent operation of the air conditioner. In addition, the data necessary for error diagnosis may include operation settings when an error of the air conditioner has occurred and data, such as temperature values including intake temperature, discharge temperature, and refrigerant temperature, refrigerant pressure values including high pressure and low pressure, and valve opening and closing control, sensed or measured during operation of the air conditioner. In addition, the data necessary for error diagnosis may include data regarding when the error of the air conditioner has occurred and data regarding the number of times of error occurrence.

During communication between the terminal 20 and the tag unit 140, a predetermined guide message indicating that it is necessary to maintain contact between the terminal 20 and the tag unit 140 may be displayed. When the communication between the terminal 20 and the tag unit 140 is completed, a guide message indicating that the communication between the terminal 20 and the tag unit 140 has been completed may be displayed. According to circumstances, a predetermined effect sound indicating that the communication between the terminal 20 and the tag unit 140 has been completed may be output through the speaker 230.

The terminal controller 210 analyzes the data received through the tag communication module 241 to diagnose an error of the air conditioner. The terminal controller 210 analyzes a failure type of the air conditioner based on an error code and derives the result of diagnosis. In addition, the terminal controller 210 may analyze other data including error codes and receive external data to perform error diagnosis.

During analysis and diagnosis of data, a progress state of analysis and diagnosis of data or a guide message indicating that analysis and diagnosis of data are being performed is output to the screen of the display unit 260 as shown in FIG. 7(*c*). At this time, when a stop key is selected, the terminal controller 210 stops the error diagnosis and displays the control menu.

When analysis and diagnosis is completed, the terminal controller 210 outputs the result of diagnosis to the screen of the display unit 260 as shown in FIG. 7(*d*). At this time, the result of diagnosis is output to the screen as brief information. In addition, a selection key 223 to select any one from between the indoor unit and the outdoor unit is displayed on the screen. When any one from between the indoor unit and the outdoor unit is selected, the terminal controller 210 displays detailed information of one selected from between the indoor unit and the outdoor unit, e.g. the indoor unit or the outdoor unit. When an enter key is selected, the control menu 221 shown in FIG. 7(*a*) is displayed.

Figure 8:
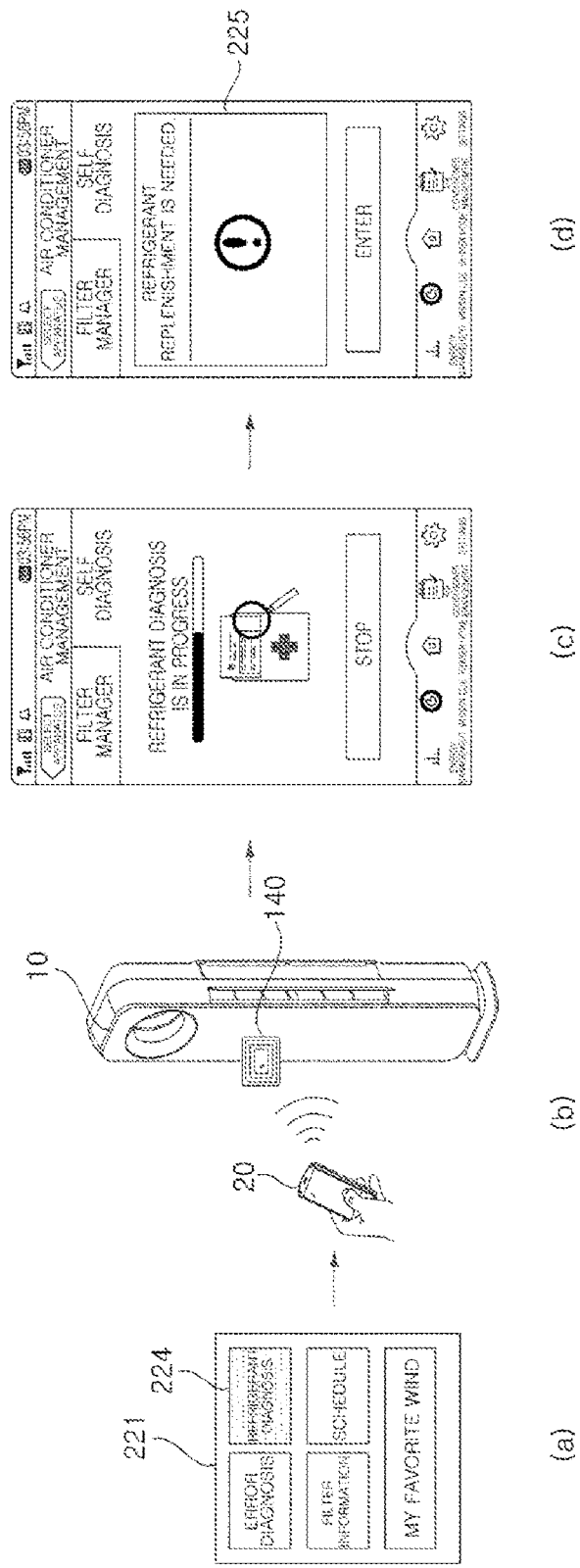

FIG. 8 is a reference view illustrating a method of the terminal diagnosing a refrigerant of the air conditioner.

As shown in FIG. 8(*a*), a control menu 221 based on the model name or the indoor unit type is displayed on the screen.

A refrigerant diagnosis item 224 is selected and then the terminal 20 is brought into contact with the tag unit 140 of the indoor unit of the air conditioner 10 as shown in FIG. 8(*b*).

As previously described, a tagging method of the terminal or a guide message indicating how the terminal tags the indoor unit may be displayed on the screen of the display unit. In addition, communication between the terminal 20 and the tag unit 140 may be performed when the terminal approaches tag unit 140 within a predetermined distance as well as contact between the terminal 20 and the tag unit 140. During communication between the terminal 20 and the tag unit 140, a predetermined guide message indicating that it is necessary to maintain contact between the terminal 20 and the tag unit 140 may be displayed. When the communication between the terminal 20 and the tag unit 140 is completed, a guide message indicating that the communication between the terminal 20 and the tag unit 140 has been completed may be displayed. According to circumstances, a predetermined effect sound indicating that the communication between the terminal 20 and the tag unit 140 has been completed may be output through the speaker 230. The guide message may be displayed as text or an image. At the same time, a voice may be output.

The terminal controller 210 communicates with the tag unit 140 of the indoor unit of the air conditioner 10 through the tag communication module 241 to receive data necessary for refrigerant diagnosis. The transmission and reception unit 142 of the tag unit 140 transmits data stored in the tag storage unit 141 to the terminal according to the request of the terminal.

Data necessary for refrigerant diagnosis may include flow rate of the refrigerant, pressure of the refrigerant, and temperature change data during operation.

The terminal controller 210 analyzes the data received through the tag communication module 241 to diagnose the amount of the refrigerant. At this time, a guide message indicating that analysis is being performed is output as shown in FIG. 8(c).

When refrigerant diagnosis is completed, the terminal controller 210 outputs the result of refrigerant diagnosis to the screen as shown in FIG. 8(d).

A guide message indicating that it is necessary to replenish the refrigerant is output. According to circumstances, a guide message indicating a refrigerant replenishment method and a service center contact method may be further output.

Figure 9:
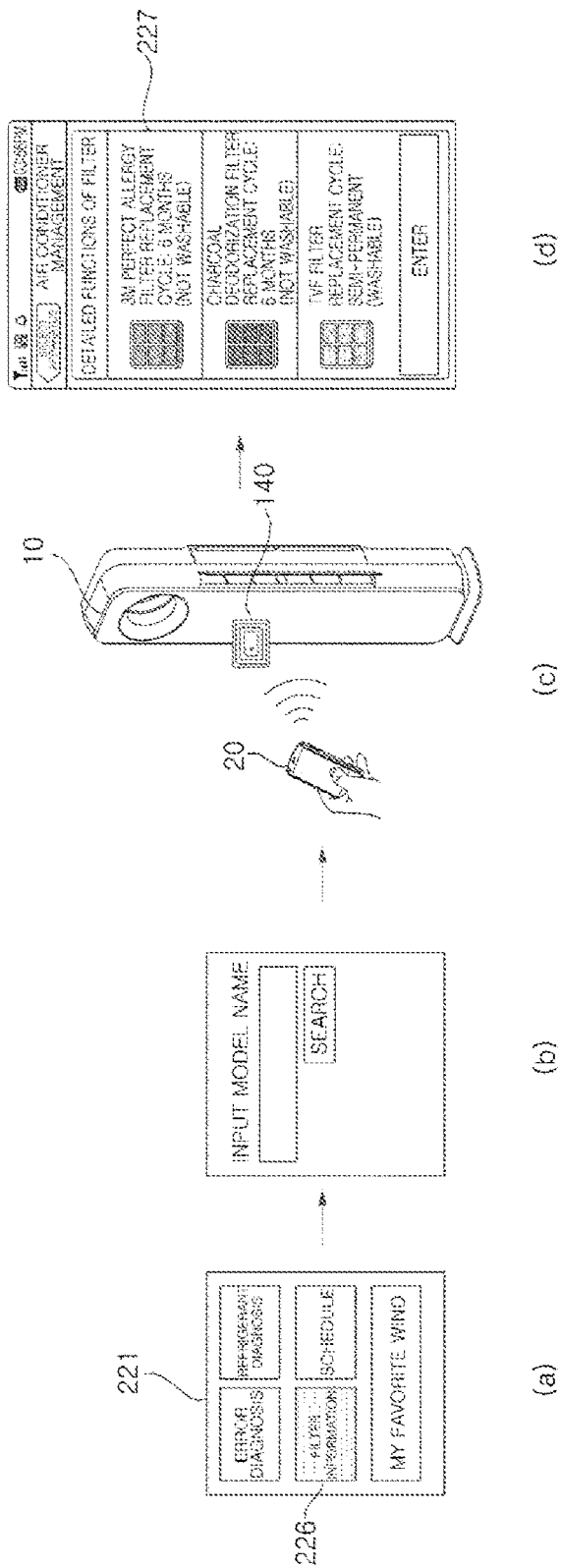

FIG. 9 is a reference view illustrating a method of the terminal checking filter information of the air conditioner. As shown in FIG. 9(a), a control menu 221 based on the model name or the indoor unit type is displayed on the screen.

When a filter information item 226 is selected, a model name input window is displayed as shown in FIG. 9(b). The model name is input and then the terminal 20 is brought into contact with the tag unit 140 of the indoor unit of the air conditioner 10 as shown in FIG. 9(c). Communication between the terminal 20 and the tag unit 140 of the indoor unit based on contact between the terminal 20 and the tag unit 140 of the indoor unit is performed as previously described.

The terminal controller 210 communicates with the tag unit 140 of the indoor unit of the air conditioner 10 through the tag communication module 241 to request product information and filter information based on the model name. The transmission and reception unit 142 of the tag unit 140 transmits product information and filter information stored in the tag storage unit 141 to the terminal according to the request of the terminal.

The terminal controller 210 compares the product information and the filter information received through the tag communication module 241 to display filter type corresponding to the produce and information regarding properties of each filter on the screen as shown in FIG. 9(d). At this time, information regarding filter types that can be applied to the indoor unit, features of the filters, a filter replacement cycle, and whether the filters can be washed or not is provided.

In addition, the terminal controller 210 may receive information regarding the type of the filter mounted in the indoor unit and when the filter has been finally replaced, compare the received information with the above-described filter information to determine when the filter will be replaced based on the filter type and to display whether or not it is necessary to replace the filter.

Figure 10:
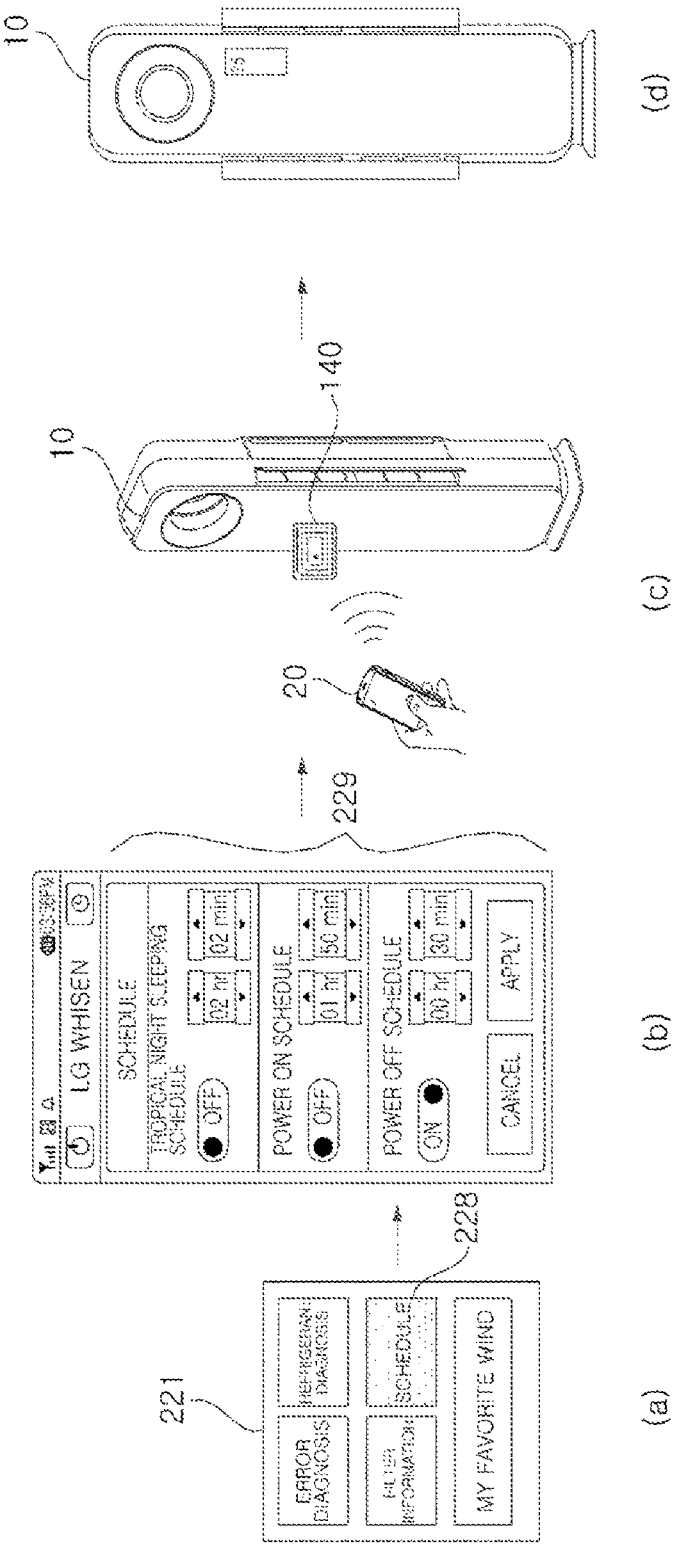

FIG. 10 is a reference view illustrating a method of the terminal setting an operation schedule of the air conditioner. As shown in FIG. 10(a), a control menu 221 based on the model name or the indoor unit type is displayed on the screen.

When a schedule item 228 is selected from the control menu 221, a schedule setting menu 229 is displayed on the screen as shown in FIG. 10(b).

A tropical night sleeping schedule, a power on schedule, and a power off schedule may be set through the schedule setting menu 229. Hours and minutes may be set to set operation time, such as power off after two hours or power off after one hour. In addition, settings may be configured such that the air conditioner is powered on or powered off at a predetermined time. Time when the air conditioner is powered on may be set such that the air conditioner is operated at a predetermined time.

An enter key is selected then the terminal 20 is brought into contact with the tag unit 140 of the indoor unit of the air conditioner 10 as shown in FIG. 10(c). When a cancel key is selected, the control menu 221 is displayed.

During communication between the terminal 20 and the tag unit 140 of the indoor unit of the air conditioner 10 through contact between the terminal 20 and the tag unit 140, a guide message indicating that the communication between the terminal 20 and the tag unit 140 is being performed may be displayed as previously described. In addition, a guide message indicating that it is necessary to maintain contact between the terminal 20 and the tag unit 140 for a predetermined time may be displayed.

The terminal controller 210 transmits the schedule information set through the schedule setting menu 229 to the tag unit 140 of the indoor unit through the tag communication module 241. The transmission and reception unit 142 of the tag unit 140 receives the schedule information from the terminal and stores the received schedule information in the tag storage unit 141. A setting indicating that new data have been stored in the tag storage unit 141 is performed.

When communication with the terminal 20 is completed during operation of the indoor unit, the controller 110 receives the schedule information stored in the tag storage unit 141, sets an operation schedule, and stores the set operation schedule in the data unit.

When the schedule information is received from the terminal 20 in a state in which the operation of the indoor unit is stopped, on the other hand, the schedule information remains stored in the tag storage unit 141. When the operation of the indoor unit is commenced, the terminal controller 110 checks that new data have been stored in the tag storage unit 141 and receives the schedule information stored in the tag storage unit 141 to set an operation schedule.

As shown in FIG. 10(d), the air conditioner may be powered off at a designated time or may be powered on at a designated time and then operated according to the set operation schedule.

When the communication between the terminal 20 and the tag unit 140 is completed, a guide message indicating that the communication between the terminal 20 and the tag unit 140 has been completed is output and the control menu 221 is displayed.

Figure 11:
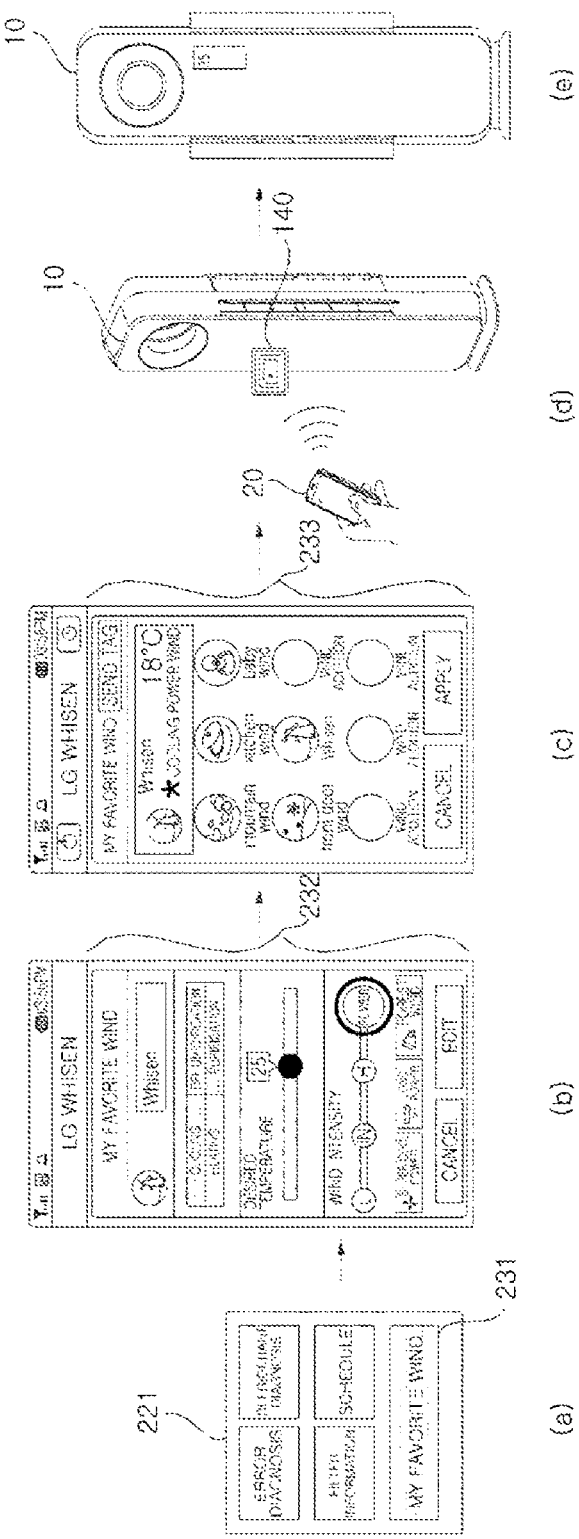

FIG. 11 is a reference view illustrating a method of the terminal setting operation of the air conditioner per user. As shown in FIG. 11(a), a control menu 221 based on the model name or the indoor unit type is displayed on the screen.

When a 'my favorite wind' item 231 is selected from the control menu 221, a user setting menu 232 is displayed on the screen as shown in FIG. 11(b).

A name of the user setting menu may be input through the user setting menu 232. One operation mode selected from among cooling, dehumidification, heating, and purification may be set through the user setting menu 232. In addition, desired temperature related to the cooling or the heating may be set through the user setting menu 232. Wind intensity may be set to one selected from low, intermediate, high, and power. In addition, wind directions, such as super cool power, long power, and forest wind, may be set.

However, the user setting menu may be changed based on the type of the air conditioner and the selected mode of the air conditioner. For example, in the dehumidification or purification mode, the setting of the desired temperature is disabled and thus cannot be selected.

Upon completion of the setting, the input user setting is further registered with a 'my favorite wind' menu 233 as shown in FIG. 11(c).

A plurality of user setting values are registered as unique names with the 'my favorite wind' menu 233 and displayed. Predetermined user settings, such as mountain wind, kitchen wind, baby wind, and front door wind, are displayed as designated icons. In addition, brief information which has been recently added is displayed on the upper end of the screen.

At this time, when the addition of a wind is selected, the user setting menu 232 is displayed as previously described with reference to FIG. 11(b). An operation mode, temperature, air volume, and wind direction may be set and further registered as a new 'may wish' menu.

When one item is selected from the 'my favorite wind' menu 233, brief information regarding the selected item is displayed on the upper end of the screen.

When an enter key is selected or a tag sending key is selected, the terminal 20 is brought into contact with the tag unit 140 of the indoor unit of the air conditioner 10 as shown in FIG. 11(d). When a cancel key is selected, the control menu 221 or the 'my favorite wind' menu 233 is displayed.

During communication between the terminal 20 and the tag unit 140 of the indoor unit of the air conditioner 10 through contact between the terminal 20 and the tag unit 140, a guide message indicating that the communication between the terminal 20 and the tag unit 140 is being performed may be displayed as previously described. In addition, a guide message indicating that it is necessary to maintain contact between the terminal 20 and the tag unit 140 for a predetermined time may be displayed.

The terminal controller 210 transmits the 'my favorite wind' setting selected from among the newly registered or pre-stored settings to the tag unit 140 of the indoor unit of the air conditioner 10 through the tag communication module 241.

The transmission and reception unit 142 of the tag unit 140 receives the setting information regarding my favorite wind from the terminal 20 and stores the received setting information in the tag storage unit 141. A setting indicating that new data have been stored in the tag storage unit 141 is performed.

The controller 110 receives the setting information regarding my favorite wind stored in the tag storage unit 141 and stores the received setting information regarding my favorite wind in the data unit. In addition, as shown in FIG. 11(3), the controller 110 changes the operation settings and controls the drive control unit such that the air conditioner is operated according to the setting information regarding my favorite wind.

At this time, when the setting information regarding my favorite wind is received from the terminal 20 in a state in which the operation of the indoor unit is stopped, the setting information regarding my favorite wind remains stored in the tag storage unit 141. When the operation of the indoor unit is commenced, the terminal controller 110 checks that new data have been stored in the tag storage unit 141 and receives the setting information regarding my favorite wind stored in the tag storage unit 141 to set an operation schedule.

The indoor unit is powered off at a designated time or is powered on at a designated time and then operated according to the set operation schedule.

When the communication between the terminal 20 and the tag unit 140 is completed, a guide message indicating completion of settings is output and the control menu 221 is displayed.

Figure 12:
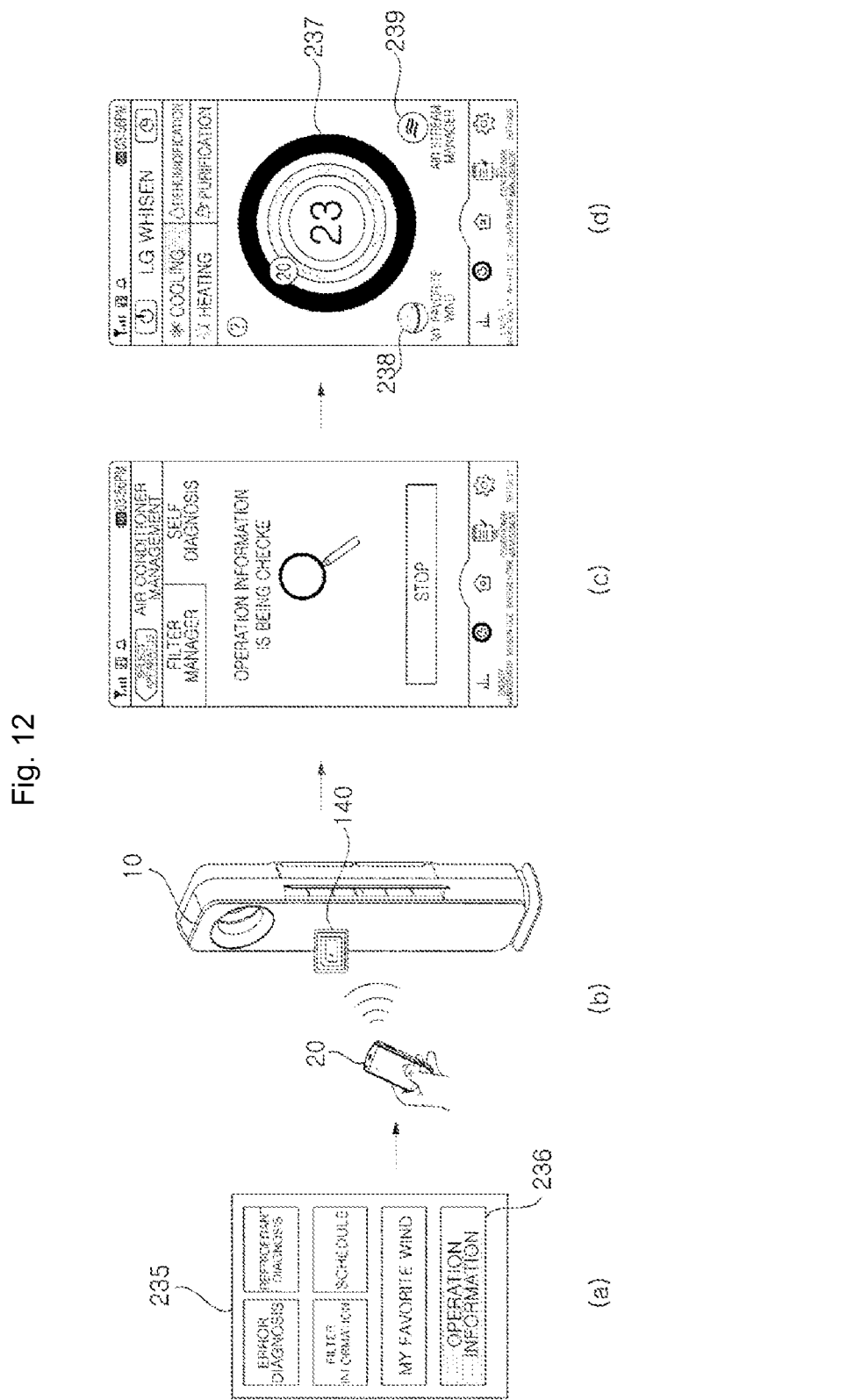

FIG. 12 is a reference view illustrating a method of the terminal checking operation information of the air conditioner. As shown in FIG. 12(a), a control menu 235 based on the model name or the indoor unit type is displayed on the screen.

An operation information item 236 is selected and then the terminal 20 is brought into contact with the tag unit 140 of the indoor unit of the air conditioner 10 as shown in FIG. 12(b). Communication between the terminal 20 and the tag unit 140 of the indoor unit based on contact between the terminal 20 and the tag unit 140 of the indoor unit is performed as previously described.

The terminal controller 210 communicates with the tag unit 140 of the indoor unit of the air conditioner 10 through the tag communication module 241 to request operation information of the air conditioner which is currently being operated. The transmission and reception unit 142 of the tag unit 140 transmits operation information stored in the tag storage unit 141 to the terminal according to the request of the terminal.

Upon receiving the operation information through the tag communication module 241, the terminal controller 210 analyzes the operation information and outputs a guide message indicating that the information is being checked as shown in FIG. 12(c).

The terminal controller 210 displays the operation information received through the tag unit 140 on the screen as shown in FIG. 12(d).

According to the received operation information, the terminal controller 210 displays the currently set operation mode on the upper end of the screen and displays temperature information 237 including desired temperature and room temperature. In addition, the terminal controller 210 displays a 'my favorite wind' icon 238 and an air stream icon 239 on a portion of the screen.

When the 'my favorite wind' icon 238 is selected, information regarding my favorite wind currently set in the air conditioner is displayed on the screen. When the air stream icon 239 is selected, on the other hand, set air stream information is displayed. At this time, the information regarding my favorite wind or the air stream information may be displayed through an additional popup window.

Through near field communication between the home appliance and the terminal, therefore, the home appliance may be controlled using the remote controller, receive data through the terminal, and simply perform operation settings and schedule settings. The user may receive an operation state of the home appliance though one contact between the home appliance and the terminal to check the operation state of the home appliance through the terminal and control operation of the home appliance based on settings input through the terminal.

As is apparent from the above description, in the home appliance, the home appliance system, and the control method thereof according to the present invention, it is possible to perform transmission and reception of data between the terminal and the home appliance using the near field communication (NFC), thereby easily checking various kinds of information of the home appliance. In addition, it is possible to diagnose a state of the home appliance and change settings of the home appliance through one contact between the terminal and the home appliance, thereby greatly improving user convenience in managing the home appliance.

Although the preferred embodiments of the present invention have been disclosed for illustrative purposes, those skilled in the art will appreciate that various modifications, additions and substitutions are possible, without departing from the scope of the invention as disclosed in the accompanying claims.

What is claimed is:

1. A terminal for controlling a home appliance, the terminal comprising:
    a display having a screen configured to display operation information of the home appliance;
    a transmitter configured to exchange data with the home appliance through near field communication (NFC); and
    a terminal controller including a processor configured to transmit setting data input through the transmitter to the home appliance, to analyze data received from the home appliance, and to output the analyzed data through the display, wherein the terminal controller executes an application to control the home appliance by
        receiving input comprising a model name or a type of the home appliance;
        configuring a control menu to include different error diagnosis and supply status diagnosis options based on the received input;
        outputting the configured control menu to the screen of the display;
        requesting error diagnosis data and supply status diagnosis data from the home appliance via the transmitter when the terminal is within a predetermined distance of or contacts a tag unit of the home appliance through NFC;
        receiving the requested data from the home appliance;
        analyzing the received data to perform error diagnosis and supply status diagnosis for the home appliance; and
        outputting a result of the diagnoses to the screen of the display at the conclusion of the diagnoses.

2. The terminal according to claim 1, wherein the terminal controller executes the application to control the home appliance by further
    receiving a selection of one or more of a component used in the home appliance, a schedule, a user setting, a product manual, and operation information through the control menu;
    outputting a setting menu corresponding to the selection on the display; and
    transmitting setting data input through the setting menu to the home appliance through the transmitter.

3. The terminal according to claim 2, wherein the terminal controller, when the user setting is selected, displays a user setting menu to register a new user setting selected from the user setting menu, and transmits setting data identifying the registered user setting to the home appliance.

4. The terminal according to claim 1, wherein the terminal controller executes the application to control the home appliance by further requesting component or operation data from the home appliance through the transmitter.

5. The terminal according to claim 1, wherein the terminal controller executes the application to control the home appliance by further outputting, to the display, information identifying a component installable in the home appliance and information identifying a time to replace the component based on a type or installation time of the component.

6. A home appliance system comprising:
    a terminal having a terminal near field communication (NFC) transmitter; and
    a home appliance comprising a tag unit having a tag transmitter to
        perform NFC and tag memory to store data of the home appliance in the tag unit,
        transmit the stored data of the home appliance to the terminal using the tag unit, and
        control operation of the home appliance in response to data received through the tag unit,
    wherein the terminal executes an application to control the home appliance by
        receiving input comprising a model name or a type of the home appliance;
        configuring a control menu to include different error diagnosis and supply status diagnosis options based on the received input;
        outputting the configured control menu to a screen of a display of the terminal;
        requesting error diagnosis data and supply status diagnosis data from the home appliance tag transmitter when the terminal transmitter is within a predetermined distance of or contacts the home appliance tag transmitter through NFC;
        receiving the requested data from the home appliance;
        analyzing the received data to perform error diagnosis and supply status diagnosis for the home appliance; and
        outputting a result of the diagnoses to the screen of the display of the terminal at the conclusion of the diagnoses;
    wherein the terminal controller, when a selection of one or more of a schedule, a user setting, or a product manual is selected through the control menu,
        displays a setting menu corresponding to the selection, and
        transmits setting data input through the setting menu to the home appliance through the tag unit.

7. A method of a terminal controlling a home appliance comprising:
    executing an application on the terminal to control the home appliance;

receiving input to the terminal comprising a model name or a type of the home appliance;

differently configuring a control menu to include different error diagnosis and supply status diagnosis options based on the received input;

outputting the configured control menu to a screen of a display of the terminal;

requesting error diagnosis and supply status diagnosis data from the home appliance through near field communication (NFC) when the terminal is within a predetermined distance of or contacts a tag unit of the home appliance;

receiving the requested data from the home appliance;

analyzing data received in response to the request to perform error diagnosis and supply status diagnosis for the home appliance;

displaying information regarding a result of the diagnoses to the screen of the display at the conclusion of the diagnoses; and displaying a setting menu corresponding to a selected item on the screen of the display, wherein the selected item is one or more of a schedule, a user setting, or a product manual.

8. The method according to claim 7, further comprising:
communicating with the home appliance through NFC to transmit data associated with the selection from the setting menu to the home appliance.

9. The method according to claim 7, further comprising:
requesting data from the home appliance through NFC when one or more of information about a component used in the home application or operation information is selected through the control menu.

10. The method according to claim 9, further comprising:
outputting information of a component installable in the home appliance to the screen of the display; and
outputting information regarding a replacement time of the component when installed in the home appliance based on a type or installation time of the component to the screen of the display.

11. The method according to claim 7, further comprising, when the a user setting is selected, displaying a user setting menu to register a new setting, and transmitting setting data identifying a registered new setting from the user setting menu to the home appliance.

12. The method according to claim 7, further comprising:
receiving, by the home appliance, data from the terminal based on sensing a contact between the terminal and the home appliance or determining that the terminal and the home appliance are positioned within a threshold distance, when the received data is setting data regarding operation of the home appliance,
storing the setting data,
changing operation settings of the home appliance based on the setting data, and
controlling operation of the home appliance; and when the received data is a request by the terminal for data,
transmitting the requested data to the terminal, and
ending communication with the terminal.

\* \* \* \* \*